(12) United States Patent
Foufa et al.

(10) Patent No.: US 12,039,470 B2
(45) Date of Patent: Jul. 16, 2024

(54) COMPUTING EXPERIENCE PERSONALIZATION TO ENHANCE USER PRODUCTIVITY

(71) Applicant: Microsoft Technology Licensing, LLC, Redmond, WA (US)

(72) Inventors: Mastafa Hamza Foufa, Narbonne (FR); Romain Gabriel Paul Rey, San Diego, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 7 days.

(21) Appl. No.: 17/646,279

(22) Filed: Dec. 28, 2021

(65) Prior Publication Data

US 2023/0206143 A1 Jun. 29, 2023

(51) Int. Cl.
*G06Q 10/0631* (2023.01)

(52) U.S. Cl.
CPC .............................. *G06Q 10/06311* (2013.01)

(58) Field of Classification Search
None
See application file for complete search history.

(56) References Cited

U.S. PATENT DOCUMENTS

| | | |
|---|---|---|
| 7,417,650 B1 | 8/2008 | Horvitz |
| 7,620,894 B1 | 11/2009 | Kahn |
| 8,024,415 B2 | 9/2011 | Horvitz et al. |
| 8,140,993 B2 | 3/2012 | Balasubramanian |
| 8,190,684 B2 * | 5/2012 | Spivack ............. G06Q 30/0222 707/758 |
| 9,183,259 B1 | 11/2015 | Marra et al. |

(Continued)

FOREIGN PATENT DOCUMENTS

| | | |
|---|---|---|
| CA | 2981429 C | 11/2020 |
| IN | 201741026314 A | 2/2019 |

(Continued)

OTHER PUBLICATIONS

"Apple's Focus Tool Targets Mental Wellbeing with Single-Message Summaries", Retrieved from: https://www.psfk.com/2021/09/apples-focus-tool-targets-mental-wellbeing-with-single-message-summaries.html, Sep. 14, 2021, 3 Pages.

(Continued)

*Primary Examiner* — Folashade Anderson
(74) *Attorney, Agent, or Firm* — Alleman Hall & Tuttle LLP

(57) ABSTRACT

A computer-implemented method for automatically personalizing a computing experience to enhance user productivity within a computing environment is disclosed. One or more proficiency parameters and one or more workload parameters are provided to a machine learning model previously-trained to assess user-specific overload criteria based at least on the one or more proficiency parameters and the one or more workload parameters. A notification-generating event in the computing environment is recognized. A notification to the user is suppressed based at least on the notification-generating event satisfying the user-specific overload criteria. The notification is supplied to the user based at least on the notification-generating event failing to satisfy the user-specific overload criteria.

19 Claims, 8 Drawing Sheets

(56) References Cited

U.S. PATENT DOCUMENTS

| | | | |
|---|---|---|---|
| 9,641,467 B2 | 5/2017 | Kuo | |
| 10,198,505 B2 | 2/2019 | Frank et al. | |
| 10,318,096 B2* | 6/2019 | Bhardwaj | G06F 3/0481 |
| 10,686,740 B2 | 6/2020 | Alfaro et al. | |
| 10,698,748 B1* | 6/2020 | Bar-on | H04L 12/1895 |
| 10,958,742 B2 | 3/2021 | Bostick et al. | |
| 10,983,683 B2 | 4/2021 | Fay | |
| 10,999,416 B1* | 5/2021 | Verma | H04L 67/55 |
| 11,038,825 B2 | 6/2021 | Le Strat et al. | |
| 11,477,068 B2* | 10/2022 | Smith | G06Q 10/06 |
| 2002/0087649 A1 | 7/2002 | Horvitz | |
| 2003/0046421 A1 | 3/2003 | Horvitz et al. | |
| 2004/0143636 A1 | 7/2004 | Horvitz et al. | |
| 2012/0115501 A1 | 5/2012 | Zheng | |
| 2013/0038437 A1 | 2/2013 | Talati et al. | |
| 2013/0332721 A1 | 12/2013 | Chaudhri et al. | |
| 2014/0237042 A1 | 8/2014 | Ahmed et al. | |
| 2016/0154574 A1 | 6/2016 | Kuo | |
| 2016/0249319 A1* | 8/2016 | Dotan-Cohen | H04M 1/72457 |
| 2017/0068736 A1 | 3/2017 | Beckley et al. | |
| 2017/0099592 A1 | 4/2017 | Loeb et al. | |
| 2017/0208167 A1 | 7/2017 | Dayama et al. | |
| 2019/0166458 A1* | 5/2019 | Deluca | H04W 4/023 |
| 2019/0172014 A1 | 6/2019 | Sohn et al. | |
| 2019/0205839 A1 | 7/2019 | Dotan-Cohen et al. | |
| 2019/0235936 A1* | 8/2019 | Murdock | H04W 68/02 |
| 2020/0398743 A1 | 12/2020 | Huber et al. | |
| 2022/0374813 A1* | 11/2022 | Braganza | G06Q 10/063112 |

FOREIGN PATENT DOCUMENTS

| | | |
|---|---|---|
| WO | 2020060641 A1 | 3/2020 |
| WO | 2021127550 A1 | 6/2021 |

OTHER PUBLICATIONS

"Filtrate App", Retrieved from: http://www.filtrateapp.com/, Retrieved on: Jan. 17, 2022, 11 Pages.

"Timely", Retrieved from: https://memory.ai/timely, Retrieved on: Jan. 17, 2022, 4 Pages.

"Use Focus on your iPhone, iPad, or iPod Touch", Retrieved from: https://support.apple.com/en-us/HT212608, Sep. 20, 2021, 4 Pages.

Ardissono, et al., "Context-Aware Notification Management in an Integrated Collaborative Environment", In Proceedings of UMAP Workshop on Adaptation and Personalization for Web 2.0, Jun. 22, 2009, pp. 21-30.

Heater, et al., "Apple Refines iOS 15 Notifications with Focus, Summary Features", Retrieved from: https://techcrunch.com/2021/06/07/apple-refines-ios-15-notifications-with-focus-summary-features/, Jun. 7, 2021, 14 Pages.

Janardhan, Kamal, "Minimize Distractions and Stay Focused with AI-Powered Updates in Microsoft 365", Retrieved from: https://www.microsoft.com/en-us/microsoft-365/blog/2019/05/06/minimize-distractions-stay-focused-ai-powered-updates-in-microsoft-365/, May 6, 2019, 6 Pages.

Mark, et al., "Effects of Individual Differences in Blocking Workplace Distractions", In Proceedings of the CHI Conference on Human Factors in Computing Systems, Apr. 21, 2018, 12 Pages.

Mehrotra, et al., "Intelligent Notification Systems: A Survey of the State of the Art and Research Challenges", In Repository of arXiv:1711.10171v2, Jan. 2, 2018, 26 Pages.

Mehrotra, et al., "PrefMiner: Mining User's Preferences for Intelligent Mobile Notification Management", In Proceedings of the ACM International Joint Conference on Pervasive and Ubiquitous Computing, Sep. 12, 2016, pp. 1223-1234.

Pradhan, et al., "Understanding and Managing Notifications", In Proceedings of IEEE INFOCOM Conference on Computer Communications, May 1, 2017, 9 Pages.

Tseng, et al., "Overcoming Distractions during Transitions from Break to Work using a Conversational Website-Blocking System", In Proceedings of the CHI Conference on Human Factors in Computing Systems, May 4, 2019, 13 Pages.

Wiggers, Kyle, "Dewo uses AI to minimize Digital Distractions", Retrieved from: https://venturebeat.com/2020/01/16/dewo-uses-ai-to-minimize-digital-distractions/, Jan. 16, 2020, 6 Pages.

"Selective notifications based on message priority determination", Published by IP. Com, Feb. 1, 2018, 6 Pages.

"International Search Report and Written Opinion Issued in PCT Application No. PCT/US22/043165", dated Dec. 23, 2022, 13 Pages.

Schafer, Paul, "Focus plan", Retrieved from: https://docs.microsoft.com/en-us/viva/insights/personal/use/focus-plan, Oct. 8, 2021, 11 Pages.

* cited by examiner

COMPUTING EXPERIENCE PERSONALIZATION TO ENHANCE USER PRODUCTIVITY

BACKGROUND

As computing technology and computing connectivity has improved over time, personal computing environments have come to include more and more sources of disturbances that can distract a user from performing computing tasks. For example, while a user is performing a task in the personal computing environment, the user may receive various notifications from different sources (e.g., computer-generated or human-generated). In some cases, the number of notifications can be great enough to distract the user from performing the task.

SUMMARY

A computer-implemented method for automatically personalizing a computing experience to enhance user productivity within a computing environment is disclosed. One or more proficiency parameters and one or more workload parameters are provided to a machine learning model previously-trained to assess user-specific overload criteria based at least on the one or more proficiency parameters and the one or more workload parameters. A notification-generating event in the computing environment is recognized. A notification to the user is suppressed based at least on the notification-generating event satisfying the user-specific overload criteria. The notification is supplied to the user based at least on the notification-generating event failing to satisfy the user-specific overload criteria.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
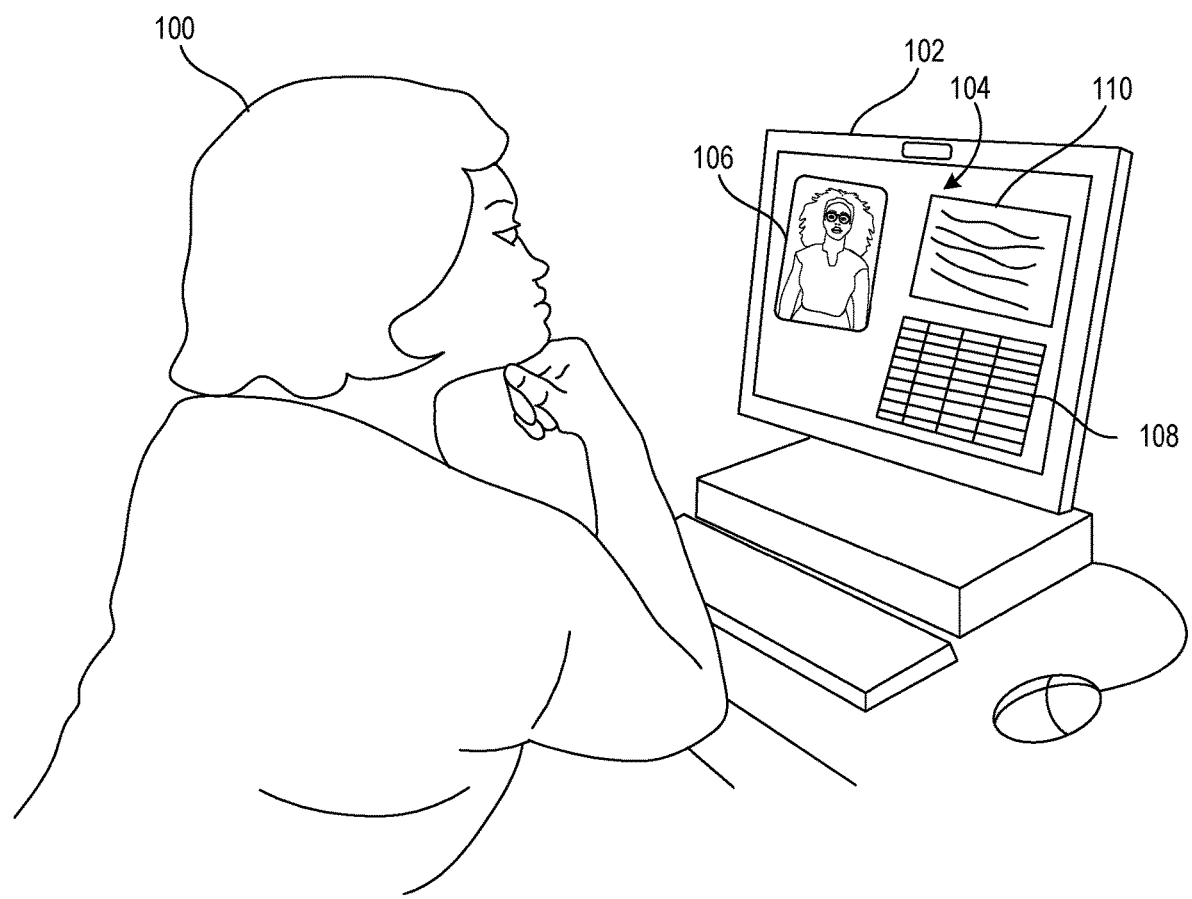
FIG. 1 shows an example scenario where a user is interacting with a computing environment that is personalized to enhance user productivity.

A computing environment may include many sources of disturbances that can distract a user from performing a task. For example, while a user is performing a task in a computing environment, the user may receive various notifications from different sources (e.g., computer-generated or human-generated). In some cases, the user may become distracted by such notifications to the point of being unable to perform the task.

To address such an issue, in one example, when a user is performing a task, a computing system may be configured to suppress all notifications from being presented to the user in order to enhance the user's productivity. The computing system is configured to employ this approach universally for any user during a time of focus when the user is performing a task. However, such an approach does not consider that different users may have different ability levels when it comes to multi-tasking and dealing with distractions or becoming overwhelmed. In the case of a user that has a keen ability to multi-task and deal with distractions, the approach of suppressing all notifications while the user is performing a task may actually hinder the overall productivity of the user, because the user may be delayed in consuming the information in the suppressed notifications. Another approach allows the computing user to "white-list" certain sources of notifications that will always be passed through to the user, even when the user has suppressed other notifications. However, such an approach is believed to be suboptimal because there are some tasks the user may be attempting to perform that require so much focus the user would prefer to delay even the whitelisted sources, and/or there are sometimes small breaks in a focus period where the user would prefer to address notifications from sources outside of the whitelist.

Accordingly, the present description is directed to an approach for automatically personalizing a computing experience to enhance user productivity. The approach includes assessing, with a previously-trained machine learning model, user-specific overload criteria for a designated user. The previously-trained machine learning model performs such a personalized overload assessment based at least on one or more proficiency parameters that are specific to the user and one or more workload parameters that are specific to the user. In this way, the user-specific overload criteria define an ability level of the specified user to multi-task and deal with distractions or become overwhelmed. The approach further includes suppressing a notification to a user based at least on a notification-generating event satisfying the user-specific overload criteria or supplying the notification to the user based at least on the notification-generating event failing to satisfy the user-specific overload criteria.

Such an approach automatically personalizes computing experiences for different users differently based at least on the different users' assessed ability levels to multi-task and deal with distractions or become overwhelmed. For example, a user having a higher assessed risk of being overwhelmed may have a greater number of notifications suppressed relative to a different user that has a lower assessed risk of being overwhelmed. In each case, the different users have different user-specific overload criteria that are used to determine whether a notification is suppressed or supplied to the user. Alternatively or additionally, with respect to selectively suppressing notifications, in some implementations, the computing experience of a user may be personalized by automatically adjusting one or more user interface parameters to enhance user focus based at least in part on the user-specific overload criteria of the user.

FIG. 1 shows an example scenario where a user 100 is interacting with other users while using a plurality of different computer application programs executed by a computer 102 in a computing environment 104. For example, the user 100 is having a conversation with a second user via a video conferencing application program 106. At the same time, both of the users are collaborating on a shared spreadsheet of a spreadsheet application program 108. Additionally, an email application program 110 is being executed in the computing environment 104.

The computer 102 is configured to track each of these user-specific interactions in the computing environment 104 for purposes of personalizing the user's computing experience to enhance user productivity within the computing environment 104. Such personalization is obtained through an operating system and/or other activity tracking service tracking of different types of parameters at least including proficiency parameters and workload parameters. Proficiency parameters are used to estimate a user's ability level to perform tasks and be productive. Workload parameters are used to estimate a user's total concurrent workload based at least on a number of tasks that the user is working on at any given time.

The computer 102 is configured to personalize the computing environment 104 by selectively varying notification filtering levels and/or managing elements displayed in the computing environment 104 (e.g., a number of concurrent open windows) automatically and dynamically in real-time based at least on the tracked proficiency parameters and the workload parameters that are specific to the user. In particular, the computer 102 is configured to employ a machine learning model that is previously-trained to assess user-specific overload criteria based at least on one or more proficiency parameters and one or more workload parameters. The user-specific overload criteria define a specific user's ability to resist being overloaded by a concurrent workload relative to other users' abilities to resist being overloaded by the same concurrent workload. For example, the computer 102 may use the user-specific overload criteria to determine whether the user would become overwhelmed by being notified of any additional notifications based at least on the user's current workload and the user's ability to multi-task and be productive. The computer 102 is configured to repeatedly (e.g., periodically, continuously) assess the user-specific overload criteria and dynamically apply selective filtering of notifications (and/or adjust one or more user interface parameters, such as manage display of various user interface elements) based at least on the user-specific overload criteria.

In the illustrated scenario, the computer 102 recognizes a notification-generating event in the computing environment 104 in the form of an email 100 being received via the email application program 110. The email is sent by a third user that is not involved with the task that the user 100 is working on with the second user 106. The computer 102 determines whether the notification-generating event satisfies the user-specific overload criteria. In this example, the user-specific overload criteria for the user 100 indicates that productivity of the user 100 will reduce based at least on receiving a notification of the email in light of the user's proficiency and the user's workload. In other words, the computer 102 determines that the notification-generating event satisfies the user-specific overload criteria, and automatically suppresses a notification of the email from being visually presented to the user. Additionally, in this example, the computer 102 suppresses an audio notification of the email from being audibly presented to the user 100. Note that the user 100 may still be able to access the email by interacting directly with the email application program 110 (e.g., by clicking on the email application program window and selecting the email to read it). However, in some implementations, if the overload criteria indicate an even more focused environment would be beneficial, the computer may additionally automatically hide the email application unless/until an email that is deemed sufficiently important is received.

In another example, a different user with the same workload who has a higher assessed ability level to multi-task would have different user-specific overload criteria and thus an equivalent notification-generating event would fail to satisfy the user-specific overload criteria for that user. In other words, that user would not be overloaded by the additional notification, and the equivalent notification would be supplied to that user.

The computer 102 is provided as a non-limiting example implementation of a computing system that is configured to automatically personalize a computing experience of a user to enhance user productivity within a computing environment. The concepts discussed herein are broadly applicable to any suitable type of computing system including a laptop computing device, a mobile computing device, a wearable computing device, a mixed/augmented/virtual reality computing device, or another type of computer.

Figure 2:
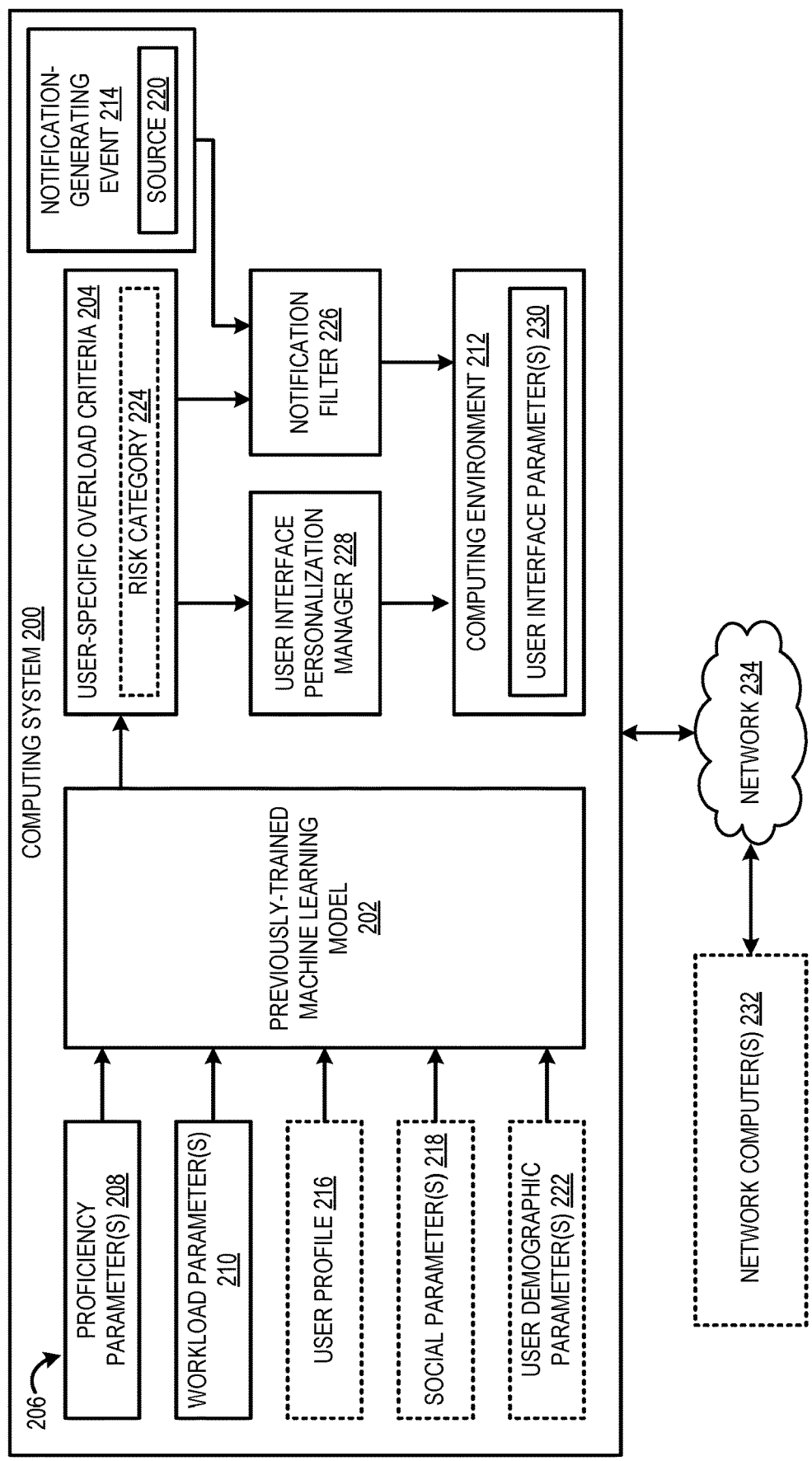
FIG. 2 shows an example computing system that is configured to automatically personalize a computing experience to enhance user productivity within a computing environment.

FIG. 2 shows an example computing system 200 that is configured to automatically personalize a computing experience of a user to enhance user productivity within a computing environment. For example, the computing system 200 may be representative of the computer 102 shown in FIG. 1. The computing system 200 includes a machine learning model 202 previously-trained to assess user-specific overload criteria 204. The user-specific overload criteria 204 define a specific user's ability to resist being overloaded by a concurrent workload relative to other users' abilities to resist being overloaded by the same concurrent workload.

The machine learning model 202 in configured to receive a plurality of user-specific input parameters 206 that are specific to the user for which the user-specific overload criteria 204 is being assessed. The plurality of input parameters 206 include one or more proficiency parameters 208 and one or more workload parameters 210. The proficiency parameter(s) 208 are used to estimate a user's ability level to perform tasks and be productive. The workload parameter(s) 210 are used to estimate a user's total concurrent workload based at least on a number, complexity, and/or attention-requirements of tasks that the user is working on at any given time.

The proficiency parameter(s) 208 may include any suitable type of parameter that estimates a user's level of proficiency/productivity. In one example, the proficiency parameter(s) 208 include a user input speed indicating a speed at which the user provides user input. In a scenario where a keyboard and mouse are employed as user input devices for the computing system 200, such a user input speed may be measured in terms of a typing speed for the keyboard and/or a click speed for the mouse. Other types of speed measurements may apply to other types of user input modalities.

In another example, the proficiency parameter(s) 208 include a task completion time that indicates an amount of time for the user to complete a specified type of computing experience task. For example, the computing system 200 may track the time for the user to complete basic tasks, such as writing emails, reading emails, and responding to emails. As another example, the computing system 200 may track a time it takes for the user to open a first document when turning on the computer or transition between using different application programs as other indications of user-specific proficiency/productivity. As another example, the computing system 200 may track how quickly a user takes action responsive to a notification and/or returns to a previous task after taking action responsive to a notification.

In some examples, the proficiency parameter(s) 208 can provide an instantaneous assessment of a user's level of proficiency/productivity. In other examples, the proficiency parameter(s) 208 can assess a user's level of proficiency/productivity over a period of time. In one example, the proficiency parameter(s) are determined based at least on one or more user-specific interactions in the computing environment 212 within a threshold period before a notification-generating event 214 is recognized by the computing system 200. For example, the notification-generating event 214 may include at least one of receiving an email, a text message, a phone call, or a video chat notification. The notification-generating event 214 may take any suitable form. Such a notification-generating event 214 may trigger a decision whether to suppress or supply a notification to a user based at least on the user-specific overload criteria 204. The threshold period may be set to any suitable amount of time. As one particular example, a click speed may be assessed during the minute prior to the user receiving an email, and that click speed may be used as a proficiency parameter. As another example, click speed may be assessed during the time of a currently-engaged-in task (e.g., the time starting at the beginning of a video conference).

In some examples, the proficiency parameter(s) 208 can be tracked over various periods to assess changes in a user's proficiency/productivity. In such examples, the proficiency parameter(s) are tracked in and determined from a user-specific profile 216. For example, the user-specific profile 216 may track a user's user input speed over a period of hours, days, weeks, months, and years. Likewise, the user-specific profile 216 may track a user's task completion speed for a number of tasks completed over a period of hours, days, weeks, months, and years. In some examples, the proficiency parameter(s) tracked in the user-specific profile 216 may be referred to as a user's proficiency history. In some implementations, a user's proficiency history may be divided into sub-proficiency histories corresponding to different tasks, thus reflecting a user's variable proficiency with respect to different tasks (e.g., video conference vs. spreadsheet).

The workload parameter(s) 210 are used to estimate a user's total concurrent workload based at least on the number, complexity, and/or attention-requirements of tasks on which the user is working. The workload parameter(s) 210 may include any suitable type of parameter that estimates a user's total concurrent workload. In one example, the workload parameter(s) 210 include a number of user interface windows and/or computer application programs that are concurrently open in the computing environment 212. In another example, the workload parameter(s) 210 include a number of user interface windows and/or computer application programs in the computing environment that are successively closed during a threshold period. In some implementations, different types of applications may be weighted differently. For example, an open video conference or chat application in which other users may expect immediate interaction will be weighted as creating more workload than an open music playing application that is only for the user's personal enjoyment and does not require immediate interaction.

In some examples, the workload parameter(s) 210 may be determined based at least on one or more user-specific interactions in the computing environment 212 within a threshold period before a notification-generating event 214 is recognized. Such a notification-generating 214 event may trigger a decision whether to suppress or supply a notification to a user based at least on the user-specific overload criteria 204. As one particular example, a number and/or type of user interface windows and/or computer application programs in the computing environment that are successively opened and/or closed may be tracked during the time immediately prior to the user beginning a current task (e.g., music player application closed, and note-taking application opened before current teleconference begins).

The workload parameter(s) 210 may be tracked over any suitable period. In some examples, the workload parameter(s) are tracked in and determined from the user-specific profile 216. The user-specific profile 216 may be used to track changes in the user's workload over time that may be referred to as a user's workload history.

The proficiency parameter(s) 208 and the workload parameter(s) 210 are provided as non-limiting examples of computer-trackable parameters. The machine learning model 202 may be configured to assess user-specific overload criteria based on any suitable computer-trackable parameters. The computing system 200 may be configured to track such parameters using any suitable approach. Non-limit examples of computer tracking approaches include, but are not limited to, tracking parameters via an operating system, one or more parameter tracking service(s), one or more parameter tracking application(s), and/or using an application programing interface (APIs) for reporting parameters.

In some implementations, the machine learning model 202 may be previously trained to assess the user-specific overload criteria 204 based at least on additional parameters. In some implementations, the machine learning model 202 may be previously-trained to determine the user-specific overload criteria 204 based at least on one or more social parameters 218 that characterize various relationships with other users, user interactions, and/or social events.

In some implementations, the computing system 200 may be configured to monitor various application programs executed in the computing environment 212 to track the social parameter(s) 218 of the user. For example, the computing system 200 may identify the various graphical user interface windows and/or application programs with which the user is interacting and further identify other users involved in these user interactions. As another example, the computing system 200 may identify various social events that the user has scheduled, and the other users involved in these social events. A social event may take any suitable form. Non-limiting examples of social events include a scheduled in-person meeting, a phone call, collaboration on a shared document, or a video conference. The social parameter(s) 218 may include such user interactions/social events as well as the other users involved in such user interactions/social events.

Figure 3:
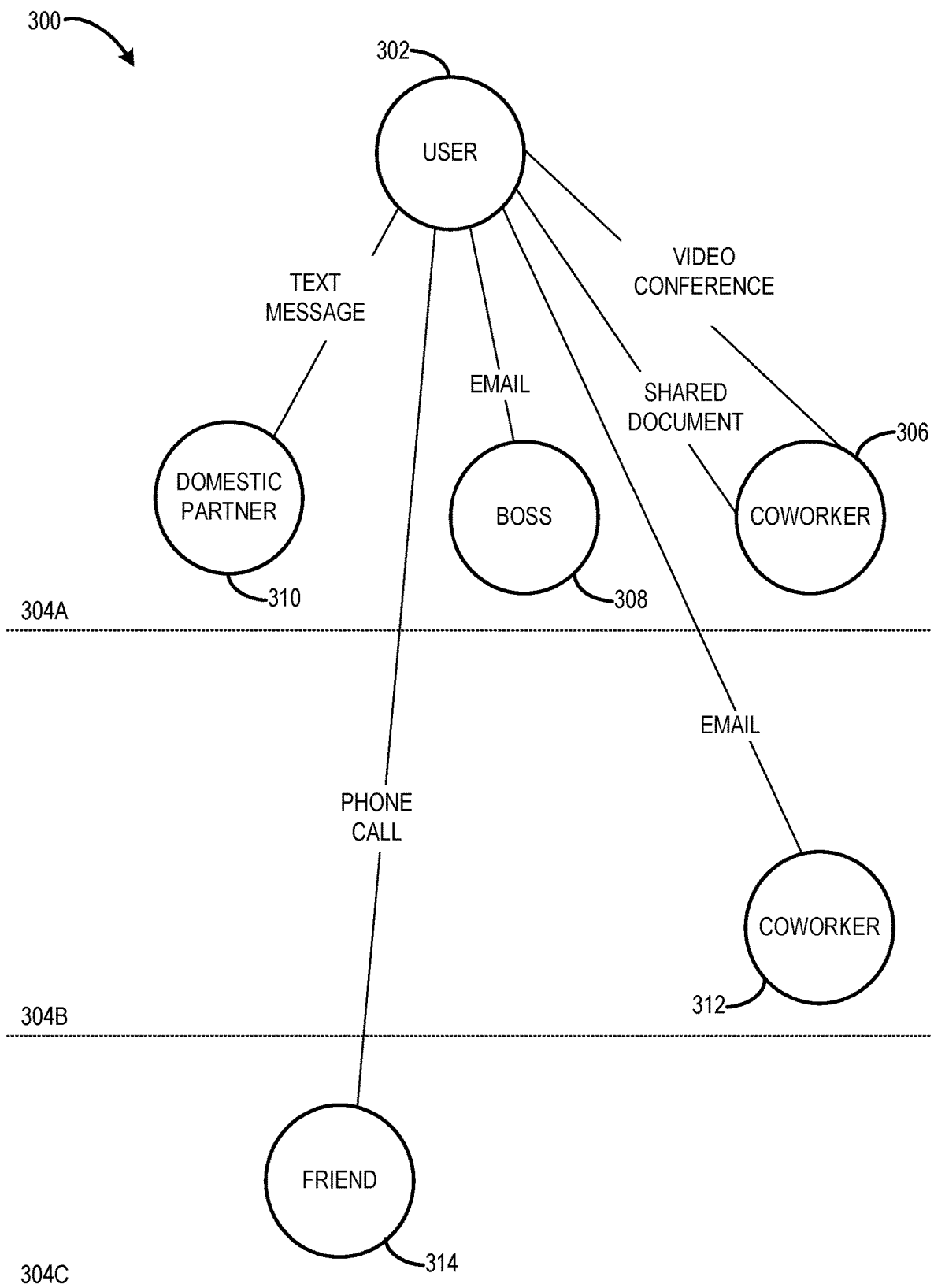
FIG. 3 shows an example social network graph of a user.

In some implementations, the social parameter(s) 218 may include a user's social network graph that represents user interactions/relationships between the user and other users. A social network graph may connect the user to other users using any suitable organizational structure including, but not limited to relationships, organizational charts, social networks, contact lists, and communication histories. FIG. 3 shows an example social network graph 300 of a user 302. In the social network graph 300, the user 302 is connected to other users via various relationships. In particular, the user 302 is connected to a first coworker 306, a boss 308, a domestic partner 310, a second coworker 312, and a friend 314.

In some implementations, the machine learning model 202 may use the social network graph 300 to determine whether or not the user-specific overload criteria 204 is satisfied with respect to the source 220 that generated the notification. In some examples, the user-specific overload criteria 204 may be satisfied or may fail to satisfy the user-specific overload criteria 204 with respect to the source 220 of the notification-generating event 214 based at least on a relationship between the user and the source 220 that is determined from the social network graph 300. For example, when the user 302 is performing a work-related task, and the user 302 receives a phone call from the friend 314, the machine-learning model 202 may be trained to determine that the user-specific overload criteria 204 is satisfied with respect to the friend 314 and suppresses the phone call, because the friend 314 is not involved in the work-related task. On the other hand, if the user 302 receives a phone call from the coworker 306, then the machine-learning model 202 may be trained to determine that the user-specific overload criteria 204 are not satisfied with respect to the friend 314, because the coworker 306 has a work relationship with the user. As such, the machine learning model 202 supplies a notification of the phone call to the user 302.

In other examples, the user-specific overload criteria 204 may not be satisfied with respect to the source 220 of the notification-generating event 214 based at least on the source 220 being a user that is participating in a social event with the user, such as the coworker 306 that is participating in the video conference with the user 302. In other words, while the coworker 306 and the user 302 are working on the same task, any notification received from the coworker 306 may be automatically supplied to the user 302. On the other hand, notifications from other users that are not working on the task may be selectively suppressed based on the proficiency parameters of the user.

In still other examples, a source may be of great enough significance to the user 302 that any notification received from the source will not satisfy the overload criteria 204, such that the notification will always be supplied to the user 302. For example, the domestic partner 310 may be of great enough significance that any notification received from the domestic partner 310 will be supplied to the user 302.

In the illustrated example, the social network graph 300 is organized into a plurality of tiers 304 (e.g., 304A, 304B, 304C) of significance that may be considered by the machine learning model to determine whether a notification is suppressed or supplied to the user 300. The plurality of tiers 304 may be determined in any suitable manner. In some examples, the plurality of tiers 304 may be manually designated by the user. In other examples, the plurality of tiers 304 may be determined by the computing system 200 via artificial intelligence tracking (e.g., using a machine learning model).

In the illustrated example, a highest tier 304A of the social network graph 300 includes the coworker 306 that is participating with the user 302 in a video conference. The coworker 306 is also working in a shared document with the user 302. Further, the highest tier 304A includes the user's boss 308, who has sent an email to the user 302. Further still, the highest tier 304A includes the user's domestic partner 310, who sent a text message to the user 302. In this case, the significance of the relationships between the user and the user's boss and user's domestic partner may cause the boss and the domestic partner to be placed in the highest tier 304A regardless of the type of user interaction/notification-generating event that links them to the user 302 in the social network graph 300. In contrast, the coworker 306 may be placed in the highest tier 304A based at least on the type of user interaction that the coworker involved in with the user 302.

A middle tier 304B of the social network graph 300 includes another coworker 312 that has sent an email to the user 302. The other coworker 3012 may have less significance at this moment relative to the coworker 306, because the user 302 is currently interacting with the coworker 306 and not the coworker 312.

A lowest tier 304C of the social network graph 300 includes a friend 314, who is placing a phone call to the user 302. In this example, since the friend 314 is not related to the user 302 through a work relationship and the user 302 is current involved in user interactions that are work-related, the friend 314 has lower significance to the user at this moment.

In some examples, the social network graph 300 is dynamic such that the different users can move between different tiers of significance. For example, different users may move between different tiers of significance depending on which type of user interaction the user 302 is involved. For example, if the user 302 is involved in a work-related user interaction work-related users may be prioritized over social-related users, and vice versa.

Note that the plurality of tiers is provided as an optional feature of the social network graph 300. In some implementations, the plurality of tiers 304 may be omitted from the social network graph 300. In other implementations, alternatively or in addition to the plurality of tiers 304, a distance between a user and another user in the social network graph 300 may define a significance of a user. In one example, the user-specific overload criteria 204 may not be satisfied with respect to the source 220 of the notification-generating event 214 based at least on the source 220 being within a threshold distance of the user 302 in the social network graph 300.

In some implementations, each node of the network graph 300 may have one or more parameters that define the relationship and may influence the overload criteria 204. For example, the relationship between the user 302 and the boss 308 may have higher significance during work hours. As another example, the relationship between the user 302 and the friend 314 may have higher significance during non-work hours. As yet another example, the relationship between the user 302 and the friend 314 may have higher significance when it is recognized that the two users are scheduled to attend a social event together, such as a basketball game.

In some implementations, the machine learning model 202 may be previously-trained to determine the user-specific overload criteria 204 based at least on one or more user demographic parameters 222. Non-limiting examples of user demographic parameters include age, gender, having a disability, region of residence, and occupation. The machine learning model 202 may be previously-trained to determine the user-specific overload criteria 204 based at least on any suitable type of user demographic parameter.

In some implementations, the machine learning model 202 may be a neural network that is previously trained with training data that is based at least on the plurality of input parameters 206 including training proficiency parameters, training workload parameters, training social parameters, and/or training user demographic parameters. Such a neural network is provided as a nonlimiting example, and any suitable combination of state-of-the-art and/or future machine learning (ML), artificial intelligence (AI), and/or other natural language processing (NLP) techniques may be used. Non-limiting examples of techniques that may be incorporated in an implementation of one or more machines include support vector machines, multi-layer neural networks, convolutional neural networks, recurrent neural networks (e.g., long short-term memory networks), associative memories (e.g., lookup tables, hash tables, Bloom Filters, Neural Turing Machine and/or Neural Random Access Memory), unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based at least on classes derived from unsupervised clustering methods), reinforcement learning (e.g., deep Q learning based at least on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

In some implementations, the machine learning model 202 may be configured to assess the user-specific overload criteria by clustering the user into one of a plurality of different risk-of-being overwhelmed categories 224 based at least on the plurality of input parameters 206 at least including the proficiency parameter(s) 208 and the workload parameter(s) 210. The machine learning model 202 may take as input the following input parameters $[x\_1, x\_2, \ldots, x\_N]$—productivity parameters 208, $[y\_1, y\_2, \ldots, y\_N]$ workload parameters 210, $[p\_1, p\_2, \ldots, p\_N]$ social parameters 218, and $[a\_1, a\_2, \ldots, a\_N]$ user demographic parameters 222. In some implementations, the machine learning model 202 may aggregate the plurality of input parameters 206 into an input vector representing the user and map the input vector to a high-dimensional space.

Figure 4:
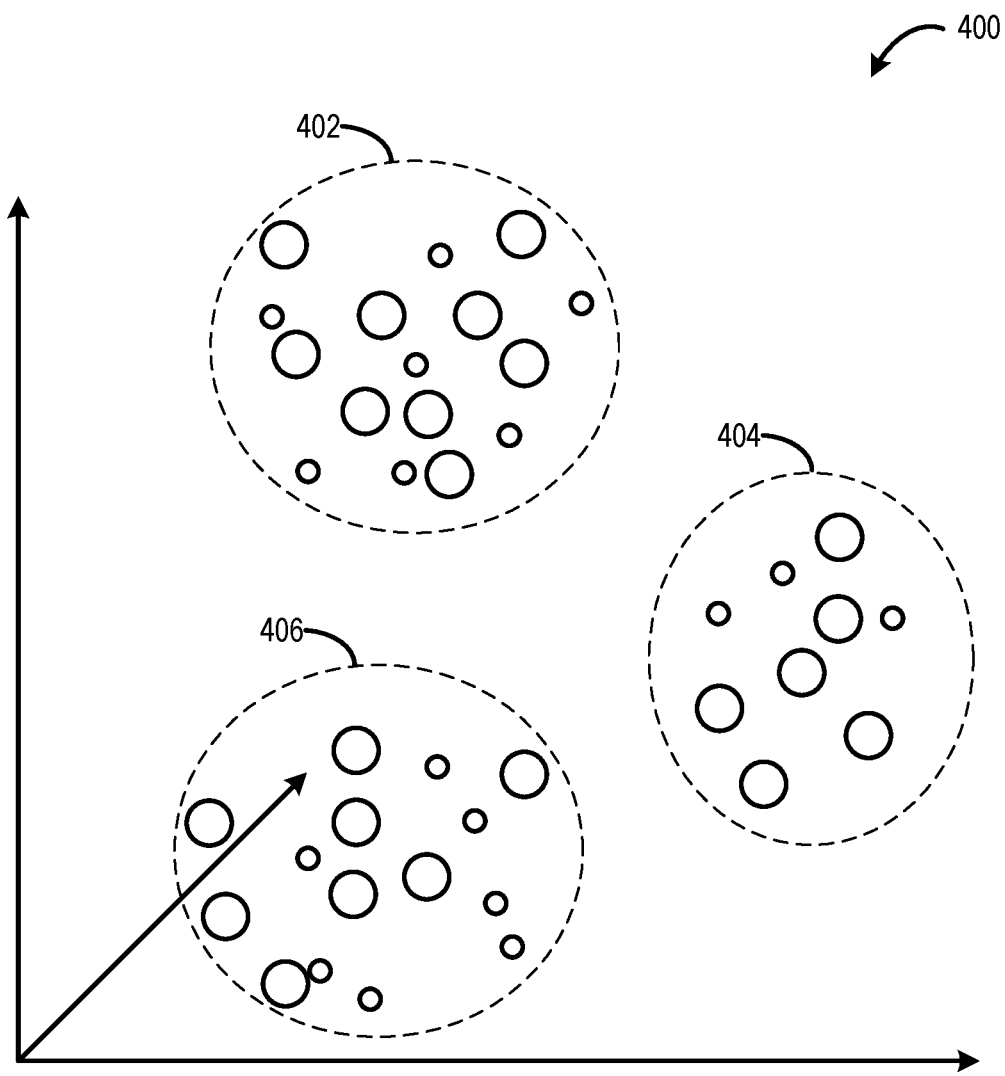
FIG. 4 shows a simplified representation of an example high-dimensional space including a plurality of vectors representing different users that are clustered into different risk-of-being overwhelmed categories.

FIG. 4 shows a simplified representation of an example high-dimensional space. Only a three-dimensional space 400 is illustrated for ease of visualization. The illustrated content space 400 utilizes three coordinates (corresponding to standard Cartesian coordinates), and thus each illustrated vector (represented as a circle) is quantified with respect to only three parameters. However, in practice, there is no limit to the number of parameters and thus the dimensionality of the space 400. Each different vector is spatially positioned at different coordinates within the space 400 based at least on the different parameters of the vector. Such spatial relationships of the different vectors allow for the machine-learning model 202 to perform clustering operations on the vectors representing the different users to identify clusters of users having similar attributes in relation to a user's ability to resist being overloaded by a concurrent workload relative to other users' abilities to resist being overloaded by the same concurrent workload.

In the illustrated example, a first cluster 402 of vectors represents users in a high risk-of-being overwhelmed category, a second cluster 404 of vectors represents users in a medium risk-of-being overwhelmed category, and a third cluster 406 of vectors represents users in a low risk-of-being overwhelmed category. In other examples, the vectors may be clustered into a different number of categories. The vectors may be clustered into any suitable number of categories corresponding to different levels of risk according to any suitable granularity of categorization. The computing system 200 may be configured to personalize computing experiences of different users in different categories of risk differently to efficiently enhance productivity of the different users in the computing environment 212.

Note that the illustrated clustering approach is provided as a non-limiting example and optionally may be performed by the machine learning model 202 in some implementations. In other implementations, the machine learning model 202 may be configured to receive the input vector and output an output overload criteria vector into a high-dimensional notification space. Further, each notification may be represented as a notification vector in the high-dimensional notification space. Then, the geometric distance between the user's output overload criteria vector and the notification vector may be determined and depending on whether the geometric distance is greater than a threshold distance, the notification may be suppressed or supplied. In still other implementations, a notification input vector may be provided as input to the machine learning model 202 with the input vector representing the user and the machine learning model 202 may internally assess workload criteria (e.g., in a hidden or output layer of the neural network) and output a suppress/supply determination for the corresponding notification. The machine learning model 202 may be configured to selectively suppress notification based at least one productivity parameter(s) and workload parameter(s) using any suitable approach.

Returning to FIG. 2, the computing system 200 includes a notification filter 226 that is configured to recognize a notification-generating 214 event in the computing environment 212. The notification filter 226 is configured to suppress a notification to the user based at least on the notification-generating event 214 satisfying the user-specific overload criteria 204 or supply the notification to the user based at least on the notification-generating event 214 failing to satisfy the user-specific overload criteria 204. The user-specific overload criteria 204 may define a user's ability to resist being overloaded by a concurrent workload in any suitable manner. The notification filter 226 selectively filters notifications depending on whether or not supplying a notification in addition to the concurrent workload will likely overwhelm the user based at least on the user's ability to multi-task and their level of proficiency/productivity. In some implementations, some or all of the functionality of the notification filter 226 may be performed by the machine learning model 202.

In some implementations, the notification filter 226 and/or the machine learning model 202 is configured to identify a source 220 of the notification-generating event 214. In some examples, the source 220 may be a human source. In other examples, the source 222 may be a computer-based source, such as a computer application program, an operating system, a computer-automated assistant, or a computer service. In such implementations, the notification filter 226 is configured to suppress a notification to the user based at least on the notification-generating event 214 satisfying the user-specific overload criteria 204 with respect to the source 220 or supply the notification to the user based at least on the notification-generating event 214 failing to satisfy the user-specific overload criteria 204 with respect to the source 220.

Since the user-specific overload criteria 204 is generated for a specific user, the user-specific overload criteria for one user may be different than user-specific overload criteria for other users. This results in the notification filter 226 suppressing or supplying notifications differently for different users. In implementations where different users are clustered into different risk categories, the notification filter 226 may be configured to apply different levels of notification filtering to the different risk categories.

Figure 5:
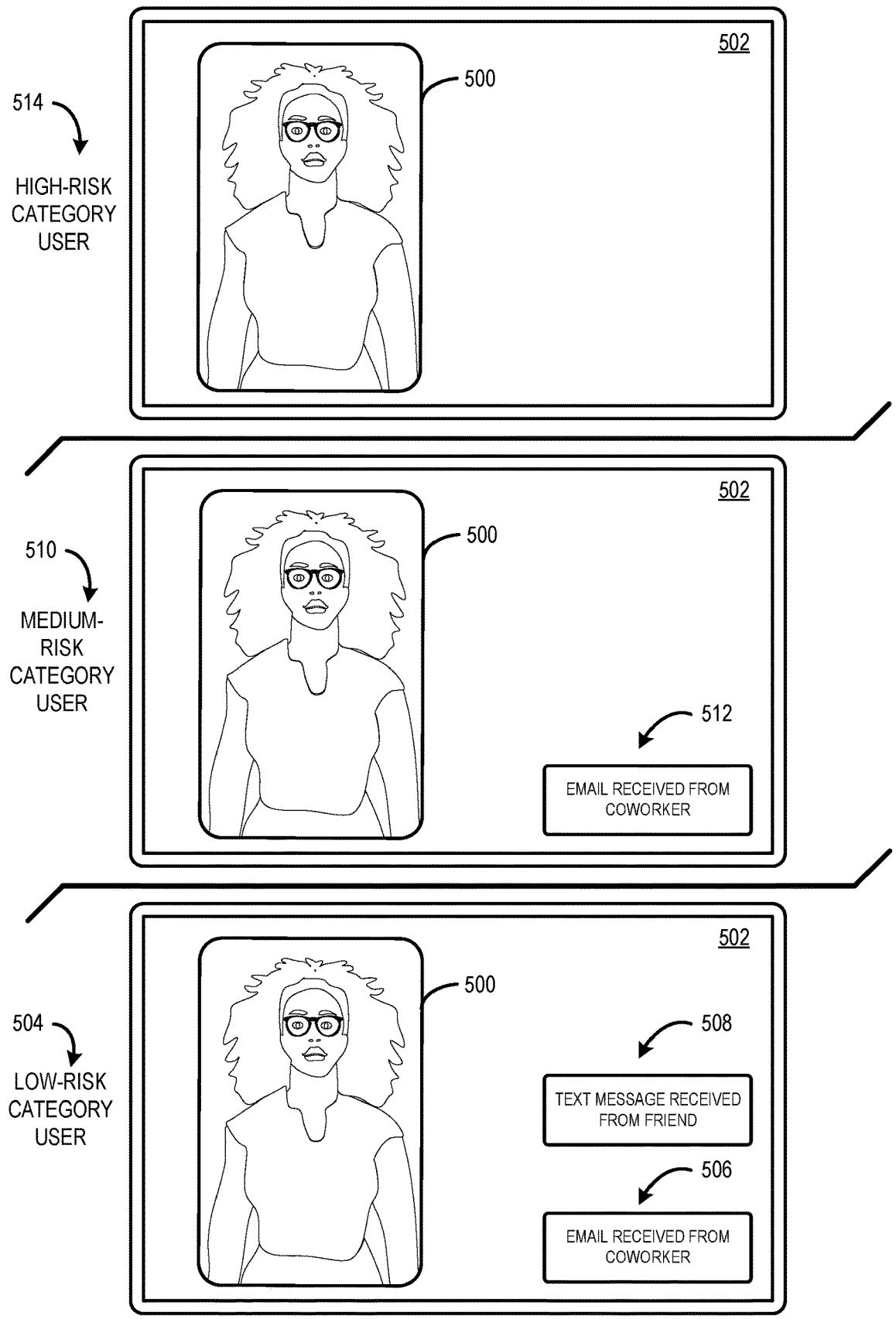
FIG. 5 shows example scenarios where different levels of notification filtering are applied to different users in different risk categories determined from the user-specific overload criteria of those users.

FIG. 5 shows example scenarios where different levels of notification filtering are applied to different users in different risk categories determined from the user-specific overload criteria of those users. In each of the example scenarios, the users have the same concurrent workload in which each user is interacting with an equivalent coworker (e.g., with respect to social parameters) via a video conference 500 in a computing environment 502. Further, in each of the example scenarios, the same two equivalent notification-generating events occur for each of the users. The first notification-generating event includes an email received from an equivalent coworker. The second notification-generating event includes a text message received from an equivalent friend.

A user in the low-risk category 504 has the lowest risk of becoming overwhelmed based at least on having the highest proficiency/productivity level relative to the concurrent workload. The machine learning model 202 and the notification filter 226 cooperate to determine that the email from the coworker fails to satisfy the user-specific overload criteria of the low-risk user, and thus supply a notification 506 of the email to the low-risk user in the computing environment 502. Further, the machine learning model 202 and the notification filter 226 cooperate to determine that the text message from the friend fails to satisfy the user-specific overload criteria of the low-risk user and supplies a notification 508 of the text message to the low-risk user in the computing environment 502. Since the low-risk user has a high ability to multi-task, the machine learning model 202 and the notification filter 226 cooperate to determine that the low-risk user will not be overwhelmed by being supplied with both the first and second notifications.

A user in the medium-risk category 510 has a medium risk of becoming overwhelmed based at least on having a medium proficiency/productivity level relative to the concurrent workload. The medium-risk user has a lower proficiency/productivity level than the low-risk user. The machine learning model 202 and the notification filter 226 cooperate to determine that the email from the coworker fails to satisfy the user-specific overload criteria of the medium-risk user and supplies a notification 512 of the email to the medium-risk user in the computing environment 502. Further, the machine learning model 202 and the notification filter 226 cooperate to determine that the text message from the friend satisfies the user-specific overload criteria of the medium-risk user and suppresses a notification of the text message from being supplied to the medium-risk user in the computing environment 502. Since the medium-risk user has a medium ability to multi-task, the machine learning model 202 and the notification filter 226 cooperate to determine that the medium-risk user will be overwhelmed by being supplied with both the first and second notifications but supplying just one notification would not overwhelm the medium-risk user.

In this example, the machine learning model 202 and the notification filter 226 cooperate to prioritize the email received from the coworker over the text message received from the friend, because the email may be more closely related to the current user interaction, that is the video conference with the coworker, than the text message from the friend. In another example where the user is playing a game with the friend at home, the machine learning model 202 and the notification filter 226 cooperate to prioritize the text message from the friend over the email from the coworker if the machine learning model 202 and the notification filter 226 cooperate to decide that only one notification should be supplied to the medium-risk user.

A user in the high-risk category 514 has a high risk of becoming overwhelmed based at least on having a low proficiency/productivity level relative to the concurrent workload. The high-risk user has a lower proficiency/productivity level than both the low-risk user and the medium-risk user. The machine learning model 202 and the notification filter 226 cooperate to determine that the email from the coworker satisfies the user-specific overload criteria of the high-risk user and suppresses a notification of the email from being supplied to the high-risk user in the computing environment 502. Further, the machine learning model 202 and the notification filter 226 cooperate to determine that the text message from the friend satisfies the user-specific overload criteria of the high-risk user and suppresses a notification of the text message from being supplied to the high-risk user in the computing environment 502. Since the high-risk user has a low ability to multi-task, the machine learning model 202 and the notification filter 226 cooperate to determine that the high-risk user will be overwhelmed by being supplied with either of the first or second notifications based at least on the concurrent workload.

Extending these example scenarios to the example social network graph 300 shown in FIG. 3. In some implementations, different users in different risk categories having the same concurrent workload may be supplied with notifications from users in different tiers 304 of the social network graph 300. For example the high-risk user may be supplied with notifications from users in the highest tier 304A and notifications from users in the medium tier 304B and the lowest tier 304C may be suppressed. The medium-risk user may be supplied with notifications from users in the highest tier 304A and users in the medium tier 304B and notifications from users in the lowest ties 304C may be suppressed.

The low-risk user may be supplied with notifications from user in all three tiers 304A, 304B, and 304C of the social network graph 300.

While the above examples provide user clustering and tiers of a social network graph, such segmenting is optional. In some implementations, a comparison between a user's overload criteria and a particular notification may be assessed via heuristics, geometric distance in a high-dimensional vector space, and/or other comparisons that do not rely on clustering or tiering.

Returning to FIG. 2, the computing system 200 includes a user interface personalization manager 228 that is configured to automatically adjust one or more user interface parameters 230 in the computing environment 212 to enhance user focus based at least in part on the user-specific overload criteria 204. The user interface personalization manager 228 may be configured to automatically adjust any suitable user interface parameter. In some examples, the user interface personalization manager 228 may be configured to automatically limit a number and/or specific ones of concurrently open windows and/or a number and/or specific ones of concurrently running computer application programs based at least on the user-specific overload criteria 204. In some examples, user interface personalization manager 228 may be configured to automatically suppress certain types of computer application programs from being accessed while a user is working on a task based at least on the user-specific overload criteria 204. In some examples, user interface personalization manager 228 may be configured to automatically adjust brightness and/or other display parameters of various windows in the computing environment 212 based at least on the relevance to the current task (or workload of different tasks) and based at least on the user-specific overload criteria 204. In some implementations, some or all of the functionality of the personalization manager 228 may be performed by the machine learning model 202.

Figure 6:
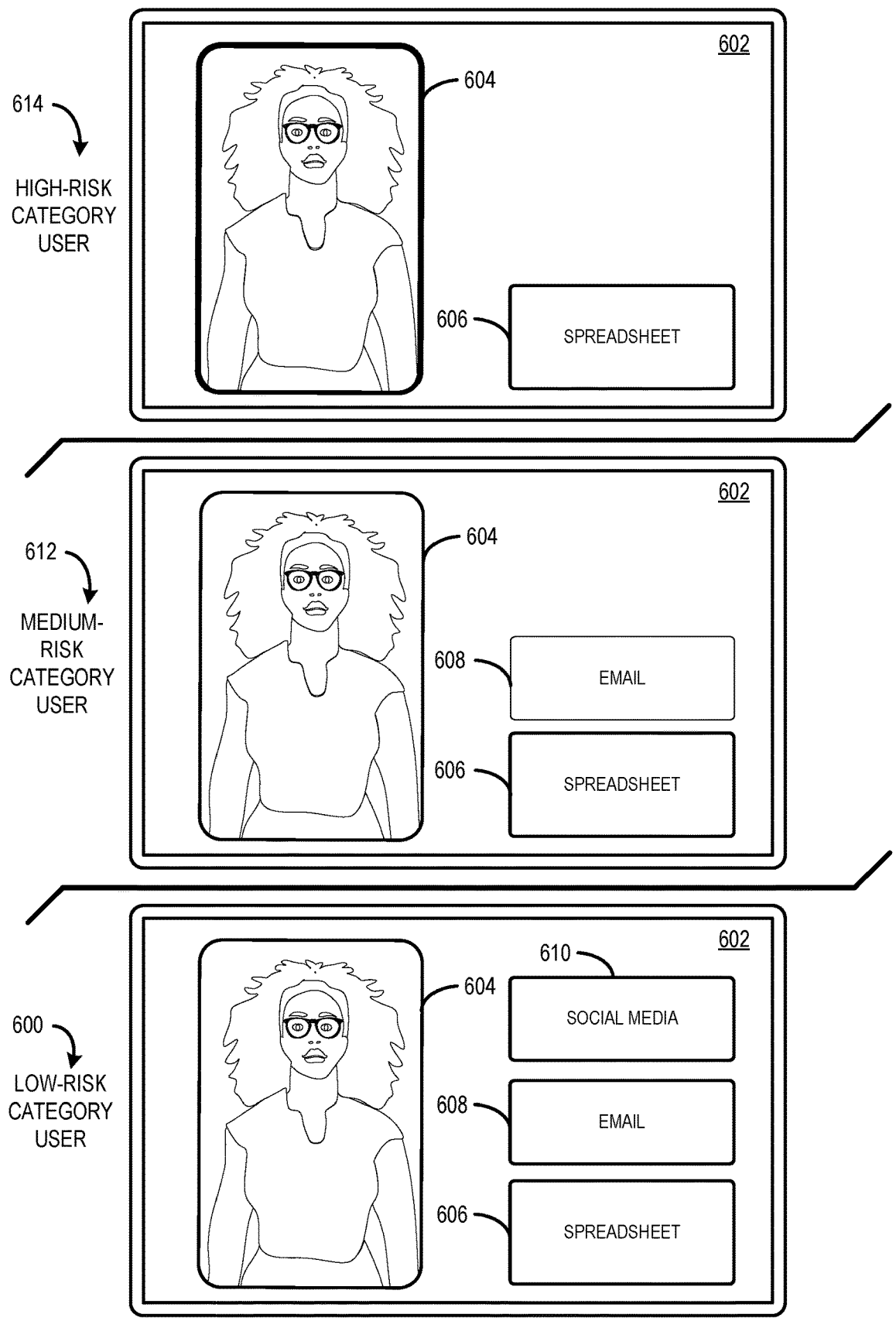
FIG. 6 shows example scenarios where user interface parameters are automatically adjusted differently for different users in different risk categories determined from the user-specific overload criteria of those users.

Since the user-specific overload criteria 204 is generated for a specific user, the user-specific overload criteria for one user may be different than user-specific overload criteria for other users. This results in the machine learning model 202 and the user interface personalization manager 228 cooperating to automatically adjust user interface parameters 230 differently for different users. In implementations where different users are clustered into different risk categories, the machine learning model 202 and/or the user interface personalization manager 228 may be configured to automatically adjust user interface parameter(s) 230 differently for users in different risk categories. FIG. 6 shows example scenarios where user interface parameters are automatically adjusted differently for different users in different risk categories determined from the user-specific overload criteria of those users.

A user in the low-risk category 600 has the lowest risk of becoming overwhelmed based at least on having the highest proficiency/productivity level. The machine learning model 202 and the user interface personalization manager 228 cooperate to determine that a video conferencing application program 604 and a spreadsheet application program 606 are the most relevant to the medium-risk user's current task, an email application program 608 is less relevant, and a social media application program 610 is the least relevant. The machine learning model 202 and the user interface personalization manager 228 cooperate to automatically adjust a computing environment 602 to display the video conferencing application program 604, the spreadsheet application program 606, the email application program 608, and the social media application program 610. The machine learning model 202 and the user interface personalization manager 228 cooperate to automatically adjust the brightness of each of these application programs to have the same brightness, so that the low-risk user can focus on each of the application programs as needed without additional emphasis being placed on any particular application program.

A user in the medium-risk category 612 has a medium risk of becoming overwhelmed based at least on having a medium proficiency/productivity level. The medium-risk user has a lower proficiency/productivity level than the low-risk user. The machine learning model 202 and the user interface personalization manager 228 cooperate to determine that the video conferencing application program 604 and the spreadsheet application program 606 are the most relevant to the medium-risk user's current task, the email application program 608 is less relevant, and the social media application program 610 is the least relevant. The machine learning model 202 and the user interface personalization manager 228 cooperate to automatically adjust the computing environment 602 to display the video conferencing application program 604, the spreadsheet application program 606, and the email application program 608. The machine learning model 202 and the user interface personalization manager 228 cooperate to automatically suppress the social media application program from being displayed in the computing environment 602 of the medium-risk user in order to aid the medium-risk user in focusing on the more relevant video conferencing application program 604 and the spreadsheet application program 606. Further, the machine learning model 202 and the user interface personalization manager 228 cooperate to automatically dim a brightness of the email application program 608 relative to the video conferencing application program 604 and the spreadsheet application program 606, because it is less relevant than the other application programs. The computing environment of the medium-risk user is more regulated than that of the low-risk user to provide additional focus cues to the medium risk user in order to compensate for the lower proficiency/productivity level of the medium-risk user.

A user in the high-risk category 614 has a high risk of becoming overwhelmed based at least on having a low proficiency/productivity level. The high-risk user has a lower proficiency/productivity level than the medium-risk user. The machine learning model 202 and the user interface personalization manager 228 cooperate to determine that the video conferencing application program 604 and the spreadsheet application program 606 are the most relevant to the high-risk user's current task, the email application program 608 is less relevant, and the social media application program 610 is the least relevant. The machine learning model 202 and the user interface personalization manager 228 cooperate to automatically adjust the computing environment 602 to display the video conferencing application program 604 and the spreadsheet application program 606. The machine learning model 202 and the user interface personalization manager 228 cooperate to automatically suppress the email application program 608 and the social media application program from being displayed in the computing environment 602 of the high-risk user in order to aid the high-risk user in focusing on the more relevant video conferencing application program 604 and the spreadsheet application program 606. The computing environment of the high-risk user is more regulated than that of the medium-risk user to provide additional focus cues to the high-risk user in order to compensate for the lowest proficiency/productivity level of the high-risk user.

While the above examples provide user clustering, such segmenting is optional. In some implementations, a comparison between a user's overload criteria and a particular notification may be assessed via heuristics, geometric distance in a high-dimensional vector space, and/or other comparisons that do not rely on clustering.

Returning to FIG. 2, in some implementations, the computing system 200 optionally may be communicatively coupled with one or more network computers 232 via a computer network 234, such as the Internet. In such implementations, additionally or alternatively, at least some or all of the functionality of the machine learning model 202, the notification filter 226, and/or the user interface personalization manage 228 may be performed by the network computer(s) 232 instead of locally on the computing system 200.

Figure 7:
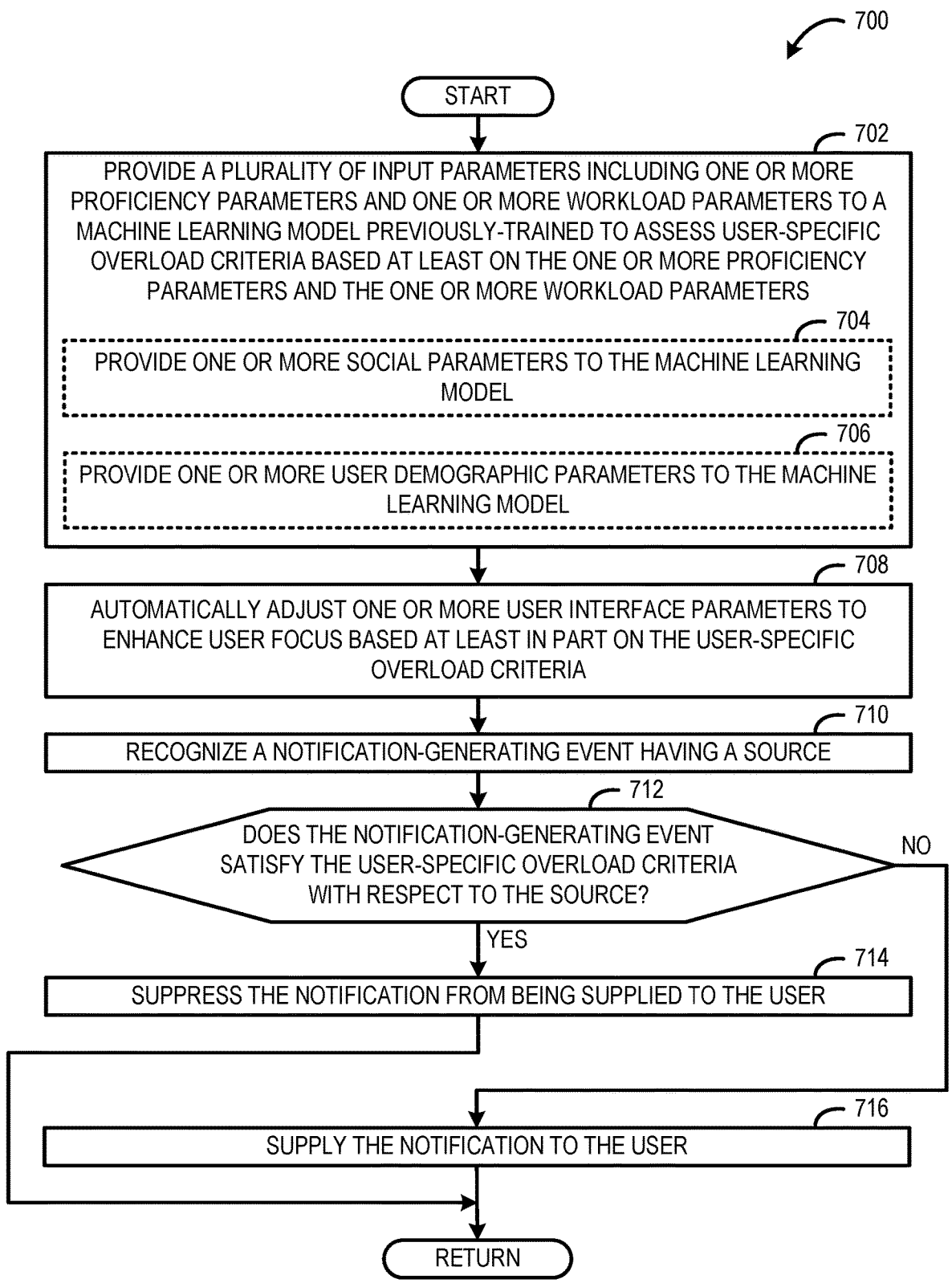
FIG. 7 shows an example computer-implemented method for automatically personalizing a computing experience to enhance user productivity within a computing environment.

FIG. 7 shows an example computer-implemented method 700 for automatically personalizing a computing experience to enhance user productivity within a computing environment. For example, the computer-implemented method 700 may be performed by the computer 102 shown in FIG. 1, the computing system 200 and/or the network computer(s) 232 shown in FIG. 2.

At 702, the computer-implemented method 700 includes providing a plurality of input parameters including one or more proficiency parameters and one or more workload parameters to a machine learning model previously-trained to assess user-specific overload criteria based at least on the one or more proficiency parameters and the one or more workload parameters.

In some implementations, at 704, the computer-implemented method 700 may include providing one or more social parameters to the machine learning model. In such implementations, the machine learning model may be previously-trained to assess the user-specific overload criteria based at least on the one or more social parameters.

In some implementations, at 706, the computer-implemented method 700 may include providing one or more user demographic parameters to the machine learning model. In such implementations, the machine learning model may be previously-trained to assess the user-specific overload criteria based at least on the one or more user demographic parameters.

At 708, the computer-implemented method 700 includes automatically adjusting one or more user interface parameters to enhance user focus based at least in part on the user-specific overload criteria. Any suitable user interface parameter may be automatically adjusted in any suitable manner based at least on at least in part on the user-specific overload criteria. In some examples, a number of concurrently open windows and/or a number of concurrently running computer application programs may be limited based at least on the user-specific overload criteria. In some examples, certain types of computer application programs may be automatically suppressed from being accessed or displayed while a user is working on a task based at least on the user-specific overload criteria. In some examples, a brightness of various windows in the computing environment may be adjusted based at least on the relevance to the current task (or workload of different tasks) and based at least on the user-specific overload criteria.

At 710, the computer-implemented method 700 includes recognizing a notification-generating event having a source. For example, a notification-generating event may include at least one of receiving an email, a text message, a phone call, or a video chat notification.

At 712, the computer-implemented method 700 includes determining if the notification-generating event satisfies the user-specific overload criteria with respect to the source. If the notification-generating event satisfies the user-specific overload criteria, then the computer-implemented method 700 moves to 714. Otherwise, the computer-implemented method 700 moves to 716.

At 714, the computer-implemented method 700 includes suppressing the notification from being supplied to the user based at least on the notification-generating event satisfying the user-specific overload criteria with respect to the source.

At 716, the computer-implemented method 700 includes supplying the notification to the user based at least on the notification-generating event failing to satisfy the user-specific overload criteria with respect to the source.

The computer-implemented method may be performed to personalize computing experiences for different users differently based at least on the different users' assessed ability levels to multi-task and deal with distractions or become overwhelmed. By selectively suppressing notifications to different degrees and/or automatically adjusting user interface parameters in a computing environment based at least on the individual ability level of a user, the computing experience may be personalized to maximize the productivity of the user based at least on the individual ability level of the user.

In some implementations, the methods and processes described herein may be tied to a computing system of one or more computing devices. In particular, such methods and processes may be implemented as a computer-application program or service, an application-programming interface (API), a library, and/or other computer-program product.

Figure 8:
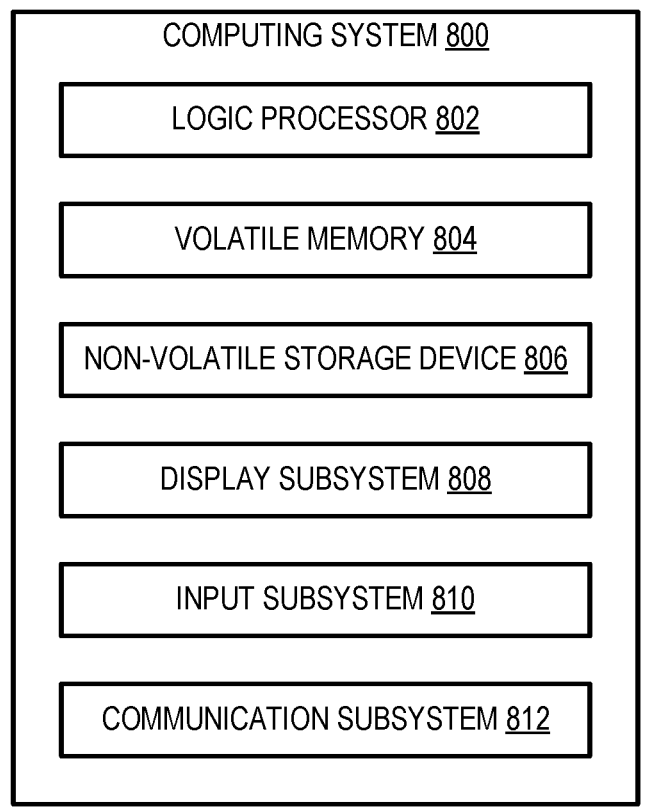
FIG. 8 shows an example computing system.

FIG. 8 schematically shows a non-limiting implementation of a computing system 800 that can enact one or more of the methods and processes described above. Computing system 800 is shown in simplified form. Computing system 800 may embody the computer 100 shown in FIG. 1, the computing system 200 and the network computer(s) 232 shown in FIG. 2. Computing system 800 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches, backpack host computers, and head-mounted augmented/mixed virtual reality devices.

Computing system 800 includes a logic processor 802, volatile memory 804, and a non-volatile storage device 806. Computing system 800 may optionally include a display subsystem 808, input subsystem 810, communication subsystem 812, and/or other components not shown in FIG. 8.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 802 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "module" may be used to describe an aspect of computing system 800 typically implemented by a processor to perform a particular function using portions of volatile memory, which function involves transformative processing that specially configures the processor to perform the function. Thus, a module may be instantiated via logic processor 802 executing instructions held by non-volatile storage device 806, using portions of volatile memory 804. It will be understood that different modules may be instantiated from the same application, service, code block, object, library, routine, API, function, pipeline, etc. Likewise, the same module, program, and/or engine may be instantiated by different applications, services, code blocks, objects, routines, APIs, functions, etc. The term "module" may encompass individual or groups of executable files, data files, libraries, drivers, scripts, database records, etc. In FIG. 2, the notification filter 226 and the user interface personalization manager 228 may be examples of modules of the computing system 200.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, microphone for speech and/or voice recognition, a camera (e.g., a webcam), or game controller.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some implementations, the communication subsystem may allow computing system 800 to send and/or receive messages to and/or from other devices via a network such as the Internet.

In an example, a computer-implemented method for automatically personalizing a computing experience to enhance user productivity within a computing environment comprises providing one or more proficiency parameters and one or more workload parameters to a machine learning model previously-trained to assess user-specific overload criteria based at least on the one or more proficiency parameters and the one or more workload parameters, recognizing a notification-generating event in the computing environment, and suppressing a notification to the user based at least on the notification-generating event satisfying the user-specific overload criteria or supplying the notification to the user based at least on the notification-generating event failing to satisfy the user-specific overload criteria. In this example and/or other examples, the machine learning model may be a neural network previously trained with training data including training proficiency parameters and training workload parameters. In this example and/or other examples, the user-specific overload criteria for a user may be different than user-specific overload criteria for other users, and the user-specific overload criteria may define the user's ability to resist being overloaded by a concurrent workload relative to other users' abilities to resist being overloaded by the same concurrent workload. In this example and/or other examples, the one or more proficiency parameters may be determined based at least on one or more user-specific interactions in the computing environment within a threshold period before the notification-generating event is recognized. In this example and/or other examples, the one or more proficiency parameters may be determined from a user-specific profile. In this example and/or other examples, the one or more proficiency parameters may include a user input speed indicating a speed at which the user provides user input. In this example and/or other examples, the one or more proficiency parameters may include a task completion time indicating an amount of time for the user to complete a specified type of computing experience task. In this example and/or other examples, the one or more workload parameters may be determined based at least on one or more user-specific interactions in the computing environment within a threshold period before the notification-generating event is recognized. In this example and/or other examples, the one or more workload parameters may include a number of user interface windows and/or computer application programs that are concurrently open in the computing environment. In this example and/or other examples, the one or more workload parameters may include a number of user interface windows and/or computer application programs in the computing environment that are successively closed during a threshold period. In this example and/or other examples, the machine learning model may be previously-trained to determine user-specific overload criteria based at least on one or more social parameters. In this example and/or other examples, the machine learning model may be previously-trained to determine user-specific overload criteria based at least on one or more user demographic parameters. In this example and/or other examples, the machine learning model may be configured to assess the user-specific overload criteria by clustering the user into one of a plurality of different risk-of-being overwhelmed categories based at least on the one or more proficiency parameters and the one or more workload parameters. In this example and/or other examples, the notification-generating event may include at least one of receiving an email, a text message, a phone call, or a video chat notification.

In another example, a computer-implemented method for automatically personalizing a computing experience to enhance user productivity within a computing environment comprises providing one or more proficiency parameters, one or more workload parameters, and one or more social parameters to a machine learning model previously-trained to assess user-specific overload criteria based at least on the one or more proficiency parameters and the one or more workload parameters, recognizing a notification-generating event having a source, and suppressing a notification to the user based at least on the notification-generating event satisfying the user-specific overload criteria with respect to the source or supplying the notification to the user based at least on the notification-generating event failing to satisfy the user-specific overload criteria with respect to the source. In this example and/or other examples, the one or more social parameters may include a social event including at least one of a scheduled meeting, a phone call, collaboration on a shared document, or a video conference. In this example and/or other examples, the user-specific overload criteria may not be satisfied with respect to the source based at least on the source being a user that is participating in the social event. In this example and/or other examples, the one or more social parameters may include a user's social network graph, and the source may include a user in the user's social network graph. In this example and/or other examples, the user's social network graph is arranged according to a hierarchy of relevance levels, the user-specific overload criteria may not be satisfied with respect to the source based at least on the user being above a threshold relevance level in the user's social network graph.

In yet another example, a computer-implemented method for automatically personalizing a computing experience to enhance user productivity within a computing environment, the computer-implemented method comprises providing one or more proficiency parameters and one or more workload parameters to a machine learning model previously-trained to assess user-specific overload criteria based at least on the one or more proficiency parameters and the one or more workload parameters, and automatically adjusting one or more user interface parameters to enhance user focus based at least in part on the user-specific overload criteria.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer-implemented method for automatically personalizing a computing experience to enhance user productivity within a computing environment, the computer-implemented method comprising:
   computer-tracking a first plurality of user-specific interactions of a user with one or more computer application programs in the computing environment to generate a first set of user parameters including one or more proficiency parameters and one or more workload parameters based on the first plurality of user-specific interactions with the one or more computer application programs;
   automatically providing the first set of user parameters to a machine learning model previously-trained to assess user-specific overload criteria that represent the user's ability to resist being overloaded by a concurrent workload based at least on the first set of user parameters, wherein the machine learning model is configured to place the user in a first risk category selected from a plurality of assessed risk categories based at least on assessing the first set of user parameters;
   recognizing a first notification-generating event in the computing environment;
   suppressing a notification to the user based at least on the notification-generating event satisfying the user-specific overload criteria corresponding to the first risk category;
   computer-tracking a second plurality of user-specific interactions of the user with one or more computer application programs in the computing environment to generate a second set of user parameters;
   automatically providing the second set of user parameters to the machine learning model, wherein the machine learning model is configured to place the user in a second risk category selected from the plurality of assessed risk categories based at least on assessing the second set of user parameters, the second risk category having a lower level of risk than the first risk category;
   recognizing a second notification-generating event in the computing environment; and
   supplying the notification to the user based at least on the notification-generating event failing to satisfy the user-specific overload criteria corresponding to the second risk category.

2. The computer-implemented method of claim 1, wherein the machine learning model is a neural network previously trained with training data including training proficiency parameters and training workload parameters.

3. The computer-implemented method of claim 1, wherein the user-specific overload criteria for the user are different than user-specific overload criteria for other users, and wherein the user-specific overload criteria define the user's ability to resist being overloaded by a concurrent workload relative to other users' abilities to resist being overloaded by the same concurrent workload.

4. The computer-implemented method of claim 1, wherein the one or more proficiency parameters are determined based at least on one or more user-specific interactions in the computing environment within a threshold period before the notification-generating event is recognized.

5. The computer-implemented method of claim 1, wherein the one or more proficiency parameters are determined from a user-specific profile.

6. The computer-implemented method of claim 1, wherein the one or more proficiency parameters includes the user input speed indicating a speed at which the user provides user input.

7. The computer-implemented method of claim 1, wherein the one or more proficiency parameters includes a task completion time indicating an amount of time for the user to complete a specified type of computing experience task.

8. The computer-implemented method of claim 1, wherein the one or more workload parameters are determined based at least on one or more user-specific interactions in the computing environment within a threshold period before the notification-generating event is recognized.

9. The computer-implemented method of claim 1, wherein the one or more workload parameters includes a number of user interface windows and/or computer application programs that are concurrently open in the computing environment.

10. The computer-implemented method of claim 1, wherein the one or more workload parameters includes a number of user interface windows and/or computer application programs in the computing environment that are successively closed during a threshold period.

11. The computer-implemented method of claim 1, wherein the machine learning model is previously-trained to determine user-specific overload criteria based at least on one or more social parameters.

12. The computer-implemented method of claim 1, wherein the machine learning model is previously-trained to determine user-specific overload criteria based at least on one or more user demographic parameters.

13. The computer-implemented method of claim 1, wherein the notification-generating event includes at least one of receiving an email, a text message, a phone call, or a video chat notification.

14. A computer-implemented method for automatically personalizing a computing experience to enhance user productivity within a computing environment, the computer-implemented method comprising:
 computer-tracking a first plurality of user-specific interactions of a user with one or more computer application programs in the computing environment to generate a first set of user parameters including one or more proficiency parameters, one or more workload parameters, and one or more social parameters based on the first plurality of user-specific interactions with the one or more computer application programs;
 automatically providing the first set of user parameters to a machine learning model previously-trained to assess user-specific overload criteria that represent the user's ability to resist being overloaded by a concurrent workload based at least on the first set of user parameters, wherein the machine learning model is configured to place the user in a first risk category selected from a plurality of assessed risk categories based at least on assessing the first set of user parameters;
 recognizing a first notification-generating event from a source in the computing environment;
 suppressing a notification to the user based at least on the notification-generating event satisfying the user-specific overload criteria with respect to the source corresponding to the first risk categoryor;
 computer-tracking a second plurality of user-specific interactions of the user with one or more computer application programs in the computing environment to generate a second set of user parameters;
 automatically providing the second set of user parameters to the machine learning model, wherein the machine learning model is configured to place the user in a second risk category selected from the plurality of assessed risk categories based at least on assessing the second set of user parameters, the second risk category having a lower level of risk than the first risk category;
 recognizing a second notification-generating event from the source in the computing environment; and
 supplying the notification to the user based at least on the notification-generating event failing to satisfy the user-specific overload criteria with respect to the source corresponding to the second risk category.

15. The computer-implemented method of claim 14, wherein the one or more social parameters includes a social event including at least one of a scheduled meeting, a phone call, collaboration on a shared document, or a video conference.

16. The computer-implemented method of claim 15, wherein the user-specific overload criteria are not satisfied with respect to the source based at least on the source being the user that is participating in the social event.

17. The computer-implemented method of claim 14, wherein the one or more social parameters includes a user's social network graph, and wherein the source includes the user in the user's social network graph.

18. The computer-implemented method of claim 17, wherein the user's social network graph is arranged according to a hierarchy of relevance levels, wherein the user-specific overload criteria are not satisfied with respect to the source based at least on the user being above a threshold relevance level in the user's social network graph.

19. A computer-implemented method for automatically personalizing a computing experience to enhance user productivity within a computing environment, the computer-implemented method comprising:
 computer-tracking a first plurality of user-specific interactions of a user with one or more computer application programs in the computing environment to generate a first set of user parameters including one or more proficiency parameters and one or more workload parameters based on the first plurality of user-specific interactions with the one or more computer application programs;
 automatically providing the first set of user parameters to a machine learning model previously-trained to assess user-specific overload criteria that represent the user's ability to resist being overloaded by a concurrent workload based at least on the first set of user parameters, wherein the machine learning model is configured to place the user in a first risk category selected from a plurality of assessed risk categories based at least on assessing the first set of user parameters;

automatically adjusting a first set of one or more user interface parameters of the one or more computer application programs in the computing environment to enhance user focus based at least in part on the user-specific overload criteria corresponding to the first risk category;

computer-tracking a second plurality of user-specific interactions of the user with one or more computer application programs in the computing environment to generate a second set of user parameters;

automatically providing the second set of user parameters to the machine learning model, wherein the machine learning model is configured to place the user in a second risk category selected from the plurality of assessed risk categories based at least on assessing the second set of user parameters, the second risk category having a lower level of risk than the first risk category; and automatically adjusting a second set of one or more user interface parameters of the one or more computer application programs in the computing environment different than the first set of one or more user interface parameters to enhance user focus based at least in part on the user-specific overload criteria corresponding to the second risk category.

\* \* \* \* \*